United States Patent [19]

Yamazaki

[11] Patent Number: 5,379,084
[45] Date of Patent: Jan. 3, 1995

[54] CAMERA HAVING A ZOOM OPTICAL SYSTEM

[75] Inventor: Yasuo Yamazaki, Hino, Japan

[73] Assignee: Olympus Optical Co., Ltd., Tokyo, Japan

[21] Appl. No.: 977,765

[22] Filed: Nov. 17, 1992

[30] Foreign Application Priority Data

Nov. 22, 1991 [JP] Japan .................................. 3-308029

[51] Int. Cl.$^6$ .................... G03B 1/18; G03B 17/02
[52] U.S. Cl. .................... 354/195.12; 354/159
[58] Field of Search ............... 354/159, 400, 195.12, 354/402

[56] References Cited

U.S. PATENT DOCUMENTS

| | | | |
|---|---|---|---|
| 4,942,417 | 7/1990 | Miyazawa et al. | 354/400 |
| 4,982,213 | 1/1991 | Kazami et al. | 354/195.12 |
| 5,053,801 | 10/1991 | Ishida et al. | 354/402 |
| 5,086,311 | 2/1992 | Haka et al. | 354/106 |
| 5,089,841 | 2/1992 | Yamada | 354/402 |
| 5,093,680 | 3/1992 | Suzuki et al. | 354/400 |
| 5,111,223 | 5/1992 | Omura | 354/111 |
| 5,113,209 | 5/1992 | Ueyama et al. | 354/400 |
| 5,119,122 | 6/1992 | Kudo et al. | 354/400 |
| 5,132,715 | 7/1992 | Taillie | 354/105 |
| 5,159,377 | 10/1992 | Suzuki et al. | 354/400 |
| 5,181,057 | 1/1993 | Takagi et al. | 354/94 |
| 5,274,414 | 12/1993 | Taniguchi et al. | 354/400 |

FOREIGN PATENT DOCUMENTS 62-251729 of 1987 Japan.
63-220118 of 1988 Japan.
2-20834 of 1990 Japan.

*Primary Examiner*—Michael L. Gellner
*Assistant Examiner*—Nicholas J. Tuccillo
*Attorney, Agent, or Firm*—Louis Weinstein

[57] ABSTRACT

In a camera according to the present invention, a driving source is driven using a zoom switch to adjust a focal distance value of a zoom optical system. In the meantime, a range finding unit measures a range to a subject. After zooming by means of the zoom switch is completed, an arithmetic logic unit serving as a focal distance determining unit and control computes the range finding value and the focal distance value to obtain a magnification for imaging a subject on film. A picture size selecting unit provides the arithmetic logic unit with a signal indicating that the picture frame is of a full size or a smaller size. Either of two-system processes each determining an imaging magnification is selected according to the signal. Thereby, an imaging magnification consistent with a picture size is specified automatically.

27 Claims, 9 Drawing Sheets

CAMERA HAVING A ZOOM OPTICAL SYSTEM

BACKGROUND OF THE INVENTION

1. Field of the Invention

The present invention relates to a camera having a zoom optical system. More particularly, this invention is concerned with a camera having a zoom optical system in which when picture sizes are switched, a ratio of a subject size to a picture size Is automatically held unchanged.

2. Related Background Art

As already known, a camera having a zoom optical system and using a roll film of 35 mm wide has been made available in recent years. In this camera, the picture size can be selectively switched between, for example, a normal full size (hereafter, normal size) of 36 mm by 24 mm that is called a Leica size and a size of 36 mm by 13 mm (hereafter, panoramic size) whose vertical dimension is smaller than the normal size.

When the picture size Is variable, a ratio of a subject size to a selected picture size must remain unchanged. To cope with this matter, Japanese Laid-Open Patent Application No. 62-251729 or Japanese Laid-Open Patent Application No. 63-220118 has proposed a camera including an auto zoom function in which a photographer can pre-set a ratio of a portrait size to a picture frame.

Japanese Laid-open Patent Application No. 2-20834 has disclosed a motor-driven zoom camera in which the longitudinal and lateral positions of the camera during photography are detected so that the image magnification for the auto zoom mode will be variable. Using this motor-driven zoom camera, a photographer need not be concerned about zooming but need merely follow a subject. This results in photographs in each of which a ratio of a subject size to a picture frame; that is, a magnification for imaging a subject on film is set to an intended value.

However, in a camera art that makes it possible to automatically set a ratio of a subject size to a picture frame to an intended value and is disclosed in the above Japanese Laid-open Patent Application No. 2-20834, the picture frame is fixed. Therefore, if the camera permits selection of the aforesaid normal mode or panoramic mode, the problems below arise.

Specifically, as shown in FIG. 11, even when a magnification for imaging a subject 41 on a film 43 is set to an intended value, if the normal mode is switched to the panoramic mode, the vertical length of the picture frame becomes smaller. Therefore, using the same imaging magnification value, as shown in FIG. 12, the top and bottom of the subject 41 are cut out. To produce a full-length portrait 42 of the subject in panoramic mode, as shown in FIG. 13, the imaging magnification must be set to a small value.

SUMMARY OF THE INVENTION

An object of the present invention is to resolve the aforesaid problems of the prior arts and to provide a camera having a zoom optical system in which even when the full size is switched to the panoramic size In auto zoom mode, the top and bottom of an image will not be cut out.

According to the present invention, when a picture size selecting means detects selection of a picture, zooming is performed using a driving source so that a ratio of a subject size to the picture size will not change. Therefore, even when the full size is switched to the panoramic size in auto zoom mode, no part of an image will be cut out.

BRIEF DESCRIPTION OF THE DRAWINGS

FIG. 4 shows the example which detects the normal mode, and FIG. 5 shows the example which detects the panoramic mode;

DETAILED DESCRIPTION OF PREFERRED EMBODIMENT

Figure 1:
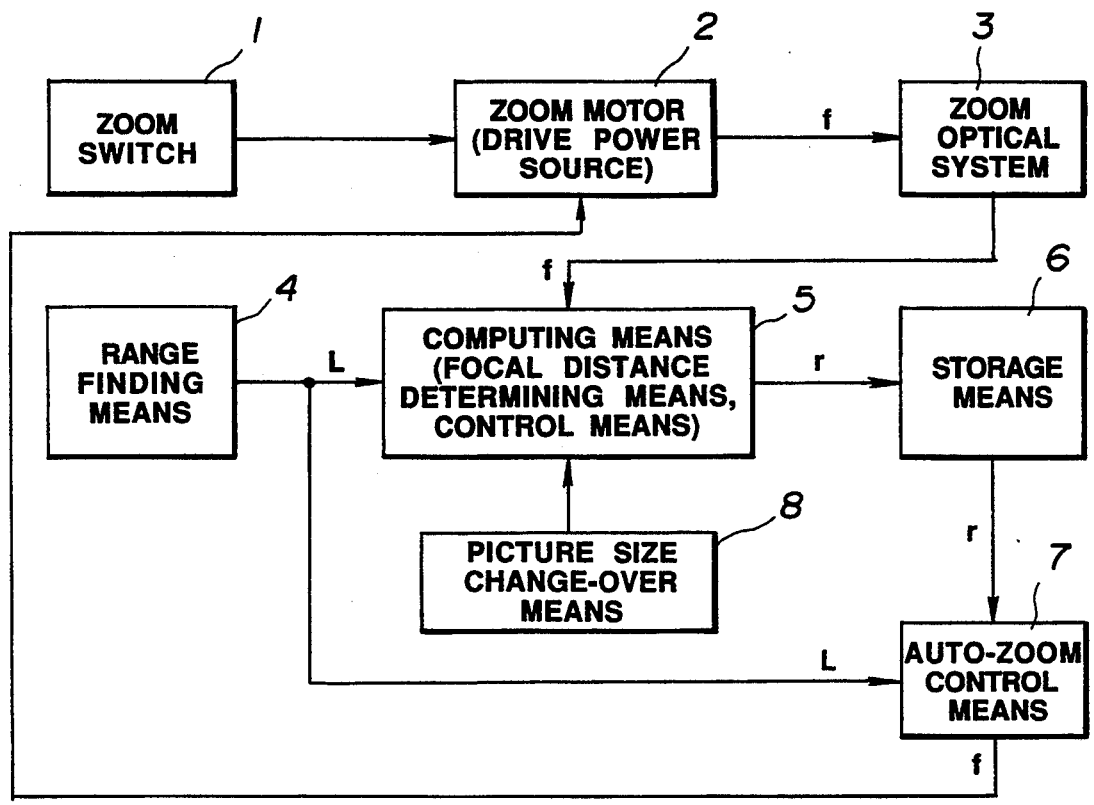
FIG. 1 is a conceptual block diagram showing a basic construction of a camera having a zoom optical system according to the present invention.

Prior to explaining embodiments of the present invention, first, the concept of a camera having a zoom will be described In conjunction with FIG. 1.

In the present invention, a zoom switch 1 is operated to drive a zoom motor 2 serving as a driving source, and thus a focal distance f of a zoom operation system 3 is adjusted. In the meantime, a range finding means 4 provides a range L to a subject as range information.

Then, the range information and focal distance f are supplied to a computing means 5 serving as a focal distance determining means and control means. After zooming by means of the zoom switch 1 is completed, the computing means 5 computes the subject range L and focal distance f to obtain a magnification r for imaging a subject on film. At this time, a picture size switching means 8 provides the computing means 5 with a signal indicating whether the picture frame is of the full size or panoramic size.

Next, either of two-system processes each determining an imaging magnification is selected according to the signal. Thereby, an imaging magnification r consistent with the picture size is set automatically.

The imaging magnification r is placed in a storage means 6. Then, an auto zoom control means 7 inputs the imaging magnification r read from the storage means 6 and the range L to a subject or range information provided by the range finding means 4. The auto zoom control means 7 controls drive of the zoom motor 2 on the basis of the imaging magnification r and subject range L until the magnification f for imaging a subject on film will match a value existent in the storage means 6.

Figure 2:
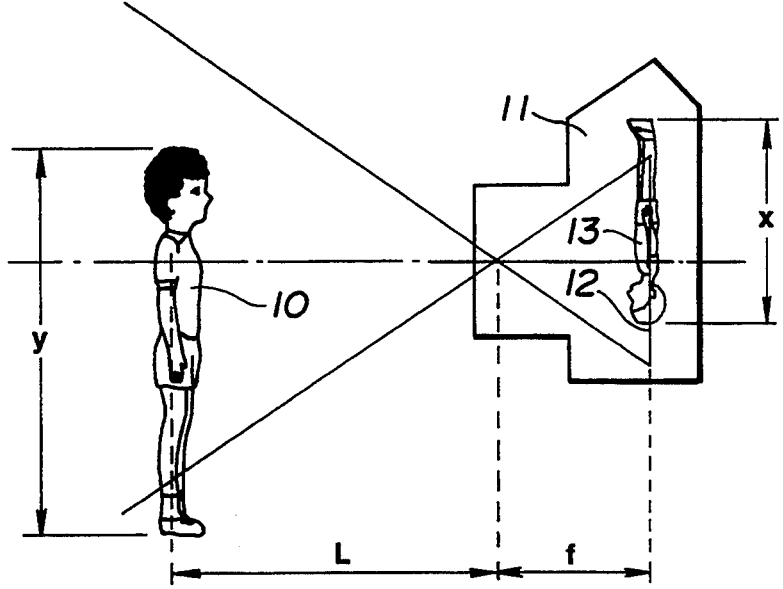
FIG. 2 shows the relationship between a camera and a subject for the purpose of explaining an imaging magnification r.

Now, a magnification for imaging a subject on film will be described. The imaging magnification is determined uniquely with a subject range L and a focal distance f of an image lens. To be more specific, as shown in FIG. 2, assuming that a person 10 is y tall, a portrait 13 formed on a film surface 12 of a camera 11 is x high, and an imaging magnification is represented as x/y=r, a relation expressed as below is established in FIG. 2.

$$f=(x/y)\cdot L=r\cdot L \quad (1)$$

In the expression (1), the size of the person 10 remains unchanged during photography. To keep the size x of the portrait 13 constant, the focal distance f must be changed by varying the subject range L so that the expression (1) will be established.

In cameras described in the Japanese Laid-open Patent Application Nos. 62-25729 and 63-220118, several kinds of values are stored in a camera as a ratio of a subject size to a picture frame. Then, assuming that several values are stored as the imaging magnification r, when a film of 35 mm wide is employed, if r ranges from 1/30 to 1/40, photography results in a profile or an equivalent. If r ranges from 1/70 to 1/80, photography results in a full-length portrait (on the condition that the subject person 10 is about 175 cm tall).

When a zoom ratio Is to be set manually and an imaging magnification r Is to be stored, an expression (2) below that is given by recomposing the expression (1) is used to calculate the imaging magnification r.

$$r=f/L \quad (2)$$

The magnification for imaging a subject on film that is employed in the present invention has been described so far.

Figure 3:
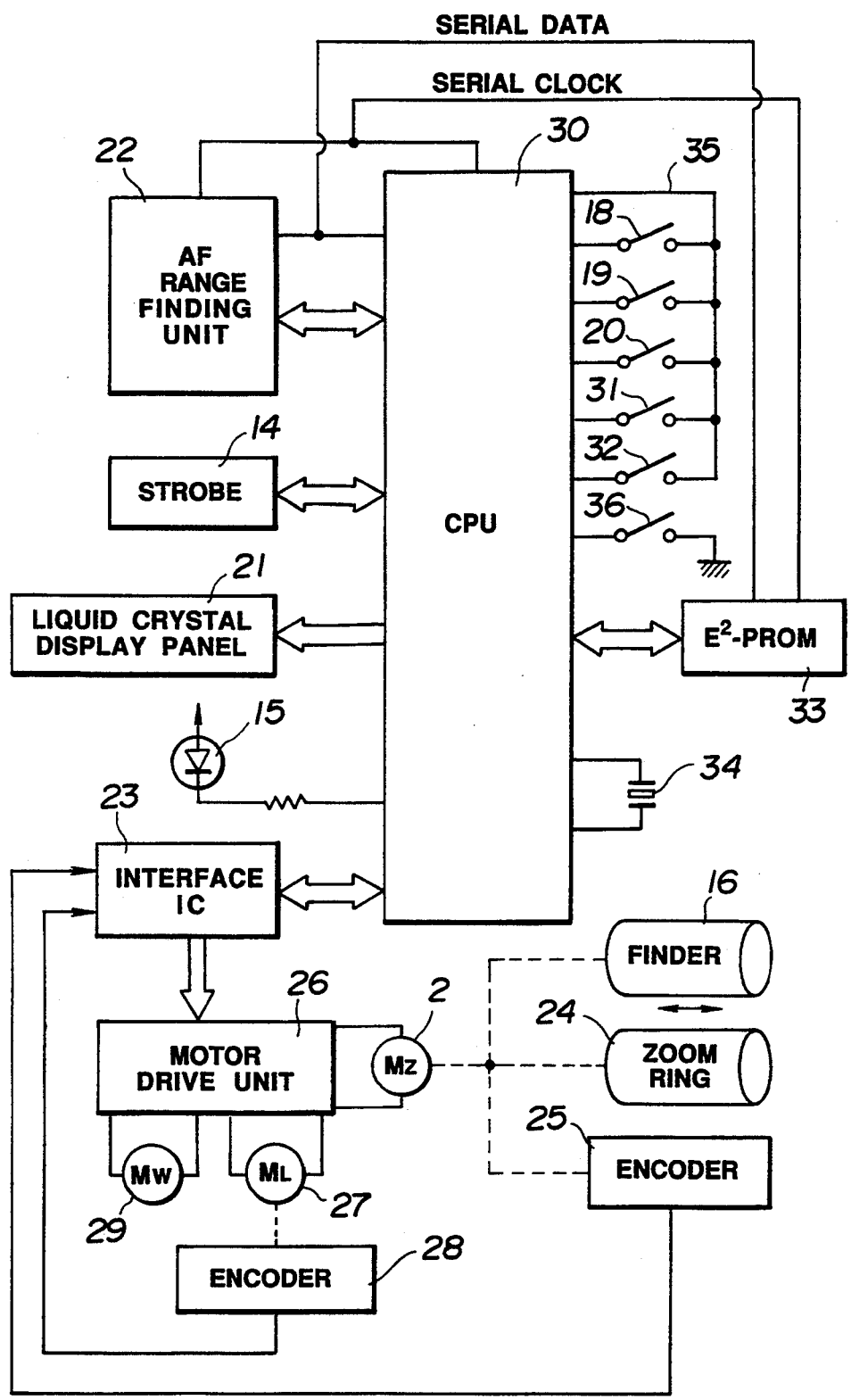
FIG. 3 is a block diagram of a camera having a zoom optical system, showing an embodiment of the present invention.

FIG. 3 is a block diagram of a construction of a camera having a zoom optical system, showing an embodiment of the present invention. A range finding unit 22 for auto focusing (AF) is an independent range finding block, which starts range finding with an instruction from a CPU 30. In this case, range finding is performed using data relative to reference data that have been defined for a certain range such as 3 m. When range finding terminates, an end signal indicating that range finding has terminated is transmitted to the CPU 30. In response to the end signal, the CPU 30 transmits a serial clock to the AF range finding unit 22. With the serial clock, range finding data is read as a serial signal from the range finding unit 22 into the CPU 30. Then, the AF range finding operation terminates.

In response to a signal from the CPU 30, a strobe 14 starts charging. When charging is completed, the CPU 30 detects the completion and sends a charging stop signal to the strobe 14. After that, flashing of the strobe 14 is executed with a signal sent from the CPU 30. A ceramic vibrator 34 generates a reference clock for the CPU 30.

Operation switches 18, 19, and 20 are connected to the CPU 30. Among them, the operation switch 18 is used to set a self-timer mode. The operation switch 19 serves as a mode selecting switch for selecting an imaging mode from among a manual mode and an auto zoom mode. The operation switch 20 is a selecting switch for selecting automatic flashing, flashing disabled, or forced flashing for flashing of the strobe 14. The mode and state selected using these operation switches 18 to 20 are displayed on a liquid crystal display panel 21. In the self-timer mode, a light emitting device (LED) 15 emits light to give an alarm.

Operation switches 31 and 32 connected to the CPU 30 are a zoom up switch and a zoom down switch respectively. In either of the manual zoom and auto zoom modes, when the zoom up switch 31 is pressed, a zoom lens moves in a direction for extending a focal distance. When the zoom down switch 32 is pressed, the zoom lens moves in a direction for reducing a focal distance.

In the auto zoom mode, zooming determines a magnification for imaging a subject. Then, a range finding operation is carried out. The measured subject range L and the focal distance of the zoom lens f are used to calculate an imaging magnification r. The imaging magnification r is stored in memory of the CPU 30.

The on or off operation of any of the operation switches 18, 19, and 20, and the zoom operation switches 31 and 32 is carried out only when a switch input state control line 35 of the CPU 30 is driven low in synchronization with an on operation of a power switch (not shown).

Figure 4:
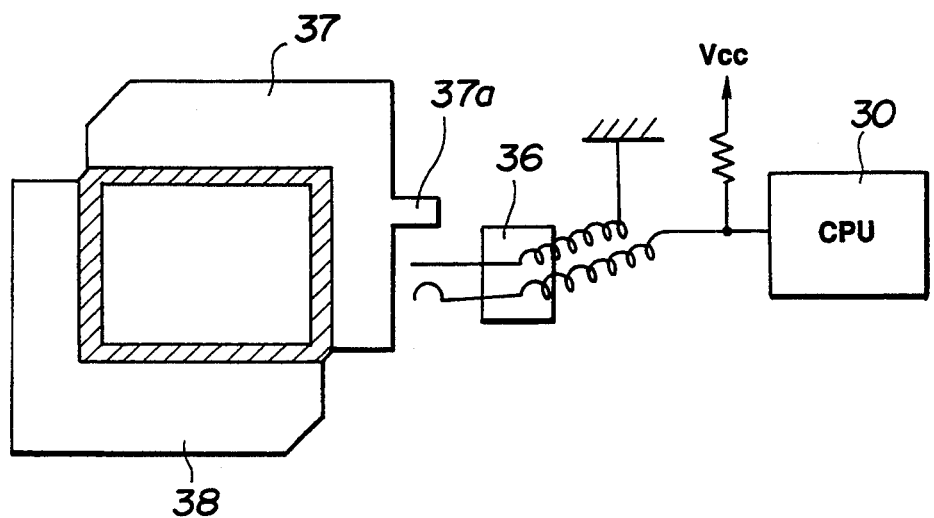
FIGS. 4 and 5 show an example of a picture size detecting means for the embodiment of FIG. 3.
Figure 5:
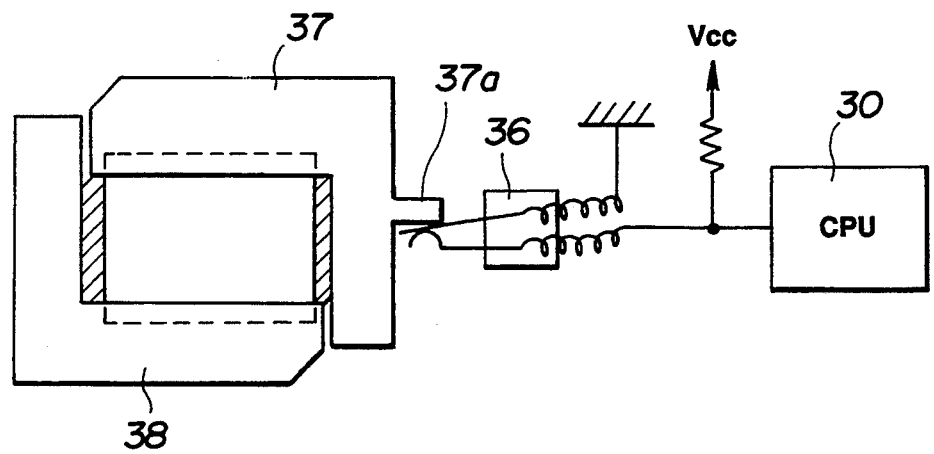

A selecting switch 36 is also connected to the CPU 30. The selecting switch 36 serves as a means for selecting a picture size that assists in detecting whether the normal mode or panoramic mode is selected. The selecting switch 36 is turned on or off with masks 37 and 38 that make up a picture frame for use in switching the picture size between the normal and panorama sizes. Thus, a picture size is detected. That is to say, the selecting switch 36 is, as shown in FIG. 4, turned off in the normal mode in which the masks 37 and 38 move mutually outward to form a normal-size picture, because a switching projection 37a of the mask 37 is disconnected from the selecting switch 36. In the panoramic mode in which the masks 37 and 38 move mutually inward to form a panoramic-size picture, the switching projection 37a of the mask 37 turns on the selecting switch 36. Thereby, the CPU 30 detects an on or off state of the switch 36 to determine whether the normal size or panoramic size is selected.

Returning to FIG. 3, the CPU 30 actuates a motor drive unit 26 via an interface IC 23. The motor drive unit 26 drives a zoom motor (Mz) 2, a lens motor (ML) 27, and a film wind and rewind motor (Mw) 29.

When a release button that is not shown is pressed halfway, the operation switch 19 Is turned on to select the auto zoom mode. In this state, the CPU 30 uses a stored imaging magnification r and calculates a focal distance f according to the expression (1). Then, the zoom motor 2 is driven by the motor drive unit 26 realized with a bridge circuit via the interface IC 23 that also serves as an automatic exposure (AE) photometry unit.

When the zoom motor 2 is driven, a zoom ring 24 moves. The position of the zoom ring 24 is detected by an encoder 25 realized with a photo-interrupter, then fed back to the CPU 30 via the interface IC 23. Based on the information from the encoder 25, the CPU 30 controls the operation of the zoom motor 2. A finder 16 is Interlocked with the drive of the zoom motor 2 to change magnifications. A photographer can, therefore, recognize an actual picture frame by looking into the finder 16. When the zoom up switch 31 or the zoom down switch 32 is pressed to vary the imaging magnification r, the imaging magnification r can be re-set to a new value.

The lens motor 27 rotates normally when driven by the motor drive unit 26 via the interface IC 23 with a signal sent from the CPU 30. Thus, the lens motor 27 moves the image lens to attain a focal distance calculated using a measured value from the AF range finding unit 22. Then, the position of the image lens is detected by the encoder 28, then fed back to the CPU 30 via the interface IC 23. Thus, the motor 27 is controlled.

Then, when the release button (not shown) is pressed fully, the lens motor 27 is driven to reverse. Then, a shutter opens and closes for exposure. After that, the film wind and rewind motor 29 feeds the film by a frame. Thus, a series of photographic operations terminates.

When AF range finding data is converted into lens position data, consideration must be taken into a mechanical variation in a lens position and a variation in a zoom coefficient. These variation values are put as adjustment data in an EEPROM 33 In the process of manufacturing of the camera. Using the AF range finding data and the data existent in the EEPROM 33, the CPU 30 calculates a lens position accurately.

The interface IC 23 is designed fundamentally as an IC for photometry. The CPU 30 uses a metered value of the interface IC 23 to control a shutter. In this case, the EEPROM 33 stores errors of metered values. The CPU 30 uses the metered data and the data existent in the EEPROM 33 to compute a correct exposure time. As for signal transfer between the EEPROM 33 and CPU 30, writing and reading of data is achieved by serial communication, and controlling of the writing and reading states is achieved directly over a line.

Next, the operation of the camera of the aforesaid embodiment that is constructed as described above will be described in conjunction with the flowcharts of FIGS. 6 to 10.

Figure 6:
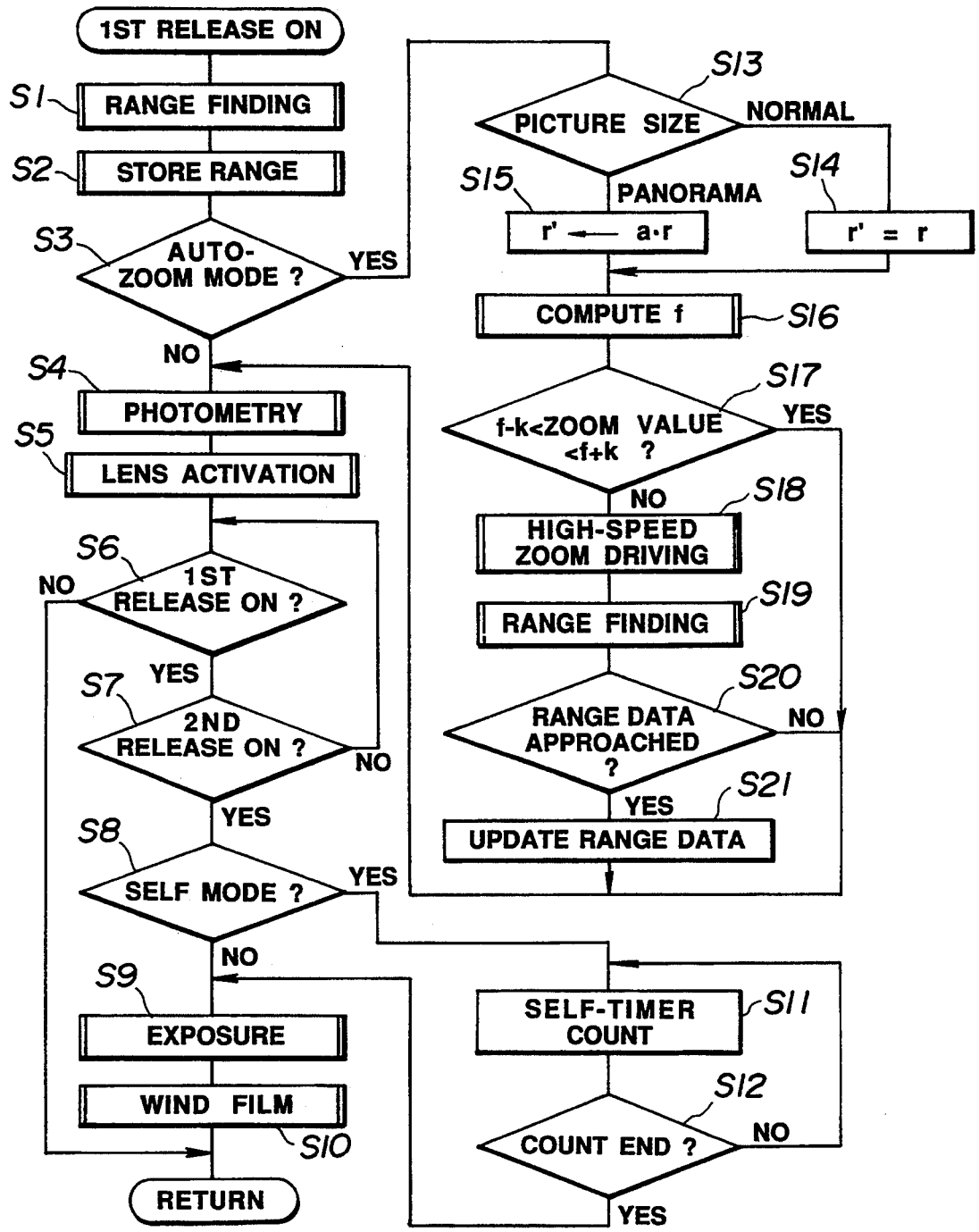
FIG. 6 is a flowchart showing a main process of operations of the camera of the aforesaid embodiment.

As shown in FIG. 6, the instant a release button is pressed halfway to turn on a first release switch (not shown), control passes to a Range Finding subroutine (step S1). Within the Range Finding subroutine, an AF range finding unit 22 performs range finding to provide a range L to a subject.

Then, after the resultant data of the measurement is stored (step S2), it is checked if the auto zoom mode is selected (step S3). If the auto zoom mode is not selected; that is, if the manual zoom mode is selected, an interface IC 23 performs photometry (step S4). Then, an image lens is driven according to the subject range L or range finding data and moves to a focusing position. Then, the first release switch and second release switch are checked (steps S6 and S7).

When the release button is pressed fully to turn on the second release switch (not shown), it Is checked if a self-timer mode is selected (step S8). If the self-timer mode is not selected, an Exposure subroutine is executed (step S9) to perform photography. After that, the film is wound (step S10). Then, photographic operations terminate. If the self-timer mode is selected, a self-timer operates to count seconds of a shutter speed (step S11). When counting is completed (step S12), the Exposure subroutine of the step S9 is executed.

Back at the step S3, if an operation switch 19 for mode selection (See FIG. 3) is turned on to select the auto zoom mode, first, it is checked if the picture in the camera is of the normal size or panoramic size (step S13).

When first release is done with the camera set to the normal-size state, an lmaging magnification r pre-set in a CPU 30 by operating a zoom up switch 31 or a zoom down switch 32 before performing the release operation is used as a new imaging magnification r as it is (step S14). When first release is done with the camera set to the panoramic-size state, an imaging magnification r stored in the CPU 30 is multiplied by a coefficient a and the product is adopted as a new imaging magnification r' (step S15).

The reason why an imaging magnification r existent in the CPU 30 must be multiplied by a coefficient a when the camera is set to the panoramic-size state will be described. The coefficient a represents a ratio of a longitudinal dimension of a normal-size picture to that of a panoramic-size picture. Normally, the coefficient a is set to the range from 0.5 to 0.6. That is to say, the longitudinal dimension of a normal-size picture on a normal 35 mm-wide film is 24 mm, while that of a panoramic-size picture ranges 13 mm to 16 mm. Assuming that the longitudinal dimension of a panoramic-size picture is 13 mm, the coefficient a is calculated as follows:

$$a = 13/24 = 0.54$$

Figure 11:
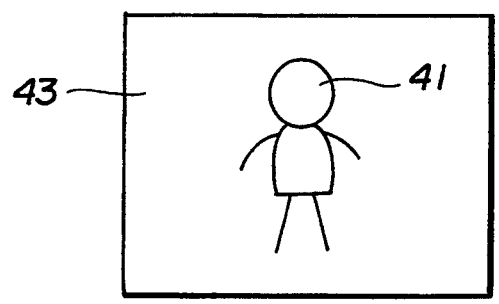
FIGS. 11, 12, and 13 are schematics for explaining picture compositions in the normal and panoramic modes in a conventional camera having a zoom optical system.
Figure 12:
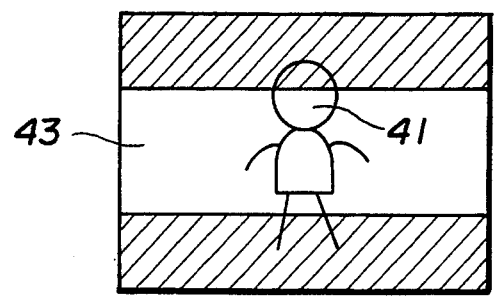
Figure 13:
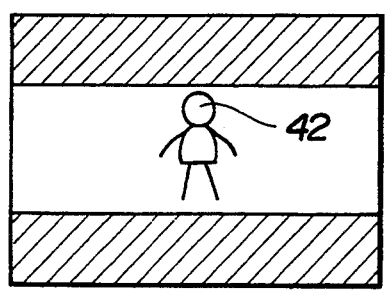

As described in conjunction with FIGS. 11 to 13, when a full-length portrait is imaged at an image magnification identical to that for a normal-size picture on a panoramic-size picture in auto zoom mode, as shown in FIG. 12, the top and bottom of the portrait are cut out. To avoid this, a magnification for a normal-size picture is multiplied by a coefficient a that is, for example, 0.54 to provide a magnification r'. Thereby, a full-length image can be formed without causing a missing top and bottom. An imaging magnification r stored in the CPU 30 by operating the zoom switch 31 or 32 is a value defined for the normal-size camera picture. What is described above is why an imaging magnification r must be multiplied by a coefficient a when photography is performed at a panoramic size.

Back at the steps S14 and S15 in FIG. 6, the imaging coefficient r' is set. Then, a subroutine for calculating a focal distance f using the imaging coefficient r' is executed (step S16). That is to say, the imaging magnification r' and the subject range L that is AF range finding data are used to calculate a focal distance f according to the expression (1). The subroutine for calculating the focal distance f will be described later in conjunction with FIG. 10.

Next, a zoom value (focal distance value) that indicates a current focal distance is compared with a focal distance f of a target position for auto zooming (step S17). If the current zoom value substantially agrees with the target focal distance f, it is determined that an intended auto zoom position is already attained. The next zoom driving is omitted. Control jumps to a subroutine "Photometry" at a step S4.

At the step S17, whether a current zoom value substantially agrees with a target focal distance f is determined according to a criterion (f±k). The (f±k) means, for example, that a current zoom value differs from a target focal distance f by ± one pulse fed from a zoom encoder 25 or that an imaging magnification differs from a stored value merely by several percentages. In short, a stored value different merely by several percentages. In short, a tolerance is specified to such an extent that even when a zoom lens is moved by the tolerance, a user will not recognize It. Anyhow, a current zoom value should be brought substantially into agreement with a target focal distance f in a bit to reduce a time lag in shutter release even a little. When first release is done immediately after an imaging magnification r is set, since a subject has not moved, subsequent zoom driving is not performed. Therefore, a shutter chance will not be missed.

If a current zoom value deviates from a focal distance f by more than ±k, the zoom motor 2 is driven to rotate fast. Thus, the zoom value is brought into agreement with the target focal distance f (step S18). That is to say, high-speed auto zoom driving is carried out.

Figure 7:
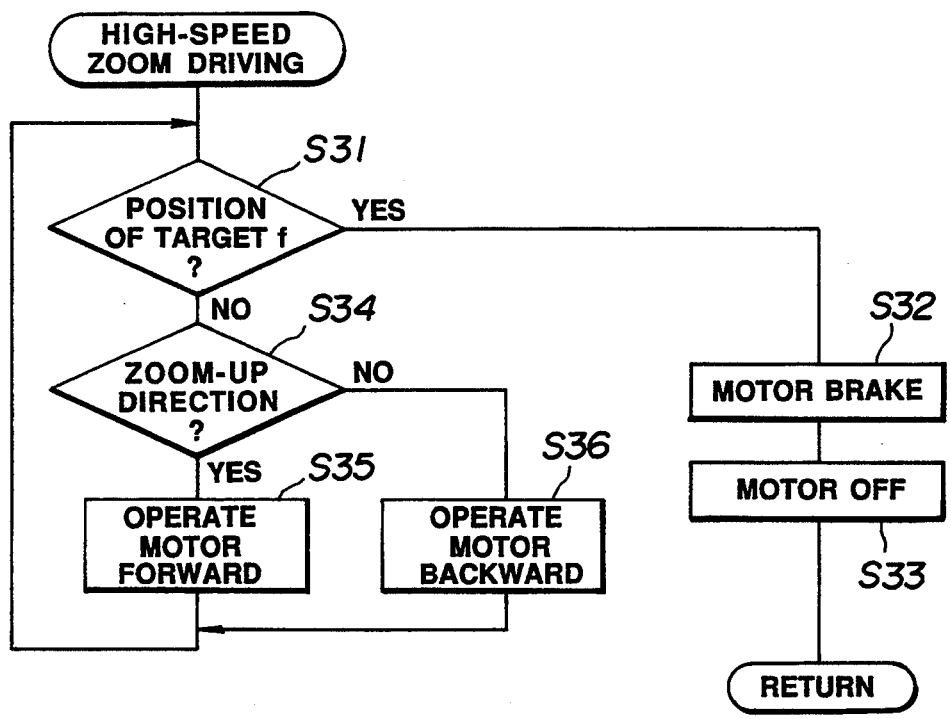
FIG. 7 is a flowchart for detailing a subroutine "High-speed Zoom Drive" in the main process of the aforesaid embodiment.

During high-speed auto zoom driving at the step S18, as shown in FIG. 7, first, it is checked if the zoom lens lies at a position for providing a target focal distance f (step S31). If the zoom lens lies at the position for providing the target focal distance f, the zoom motor 2 is braked (step S32), then turned off (step S33). Then, control is returned.

When the zoom lens does not lie at the position for providing the target focal distance, if the zoom lens must be moved in the zoom-up direction, the zoom motor 2 is driven to rotate normally (step S34 and S35). If the zoom lens must be moved in the zoom-down direction, the zoom motor 2 is driven to reverse (steps S34 and S36).

After the high-speed zoom driving is completed, as shown in the flowchart of FIG. 6, Range Finding is rerun (step S19). The reason why a range finding operation is executed at this stage is to check if a subject has come closer during high-speed zoom driving. Specifically, even when the zoom lens is moved fast, if a subject moves fast or stays close, the subject may be out of a depth of field. Therefore, Range Finding is rerun so that a focus will be aligned with a latest position.

Then, it is checked if range finding data or a subject range L is reduced within a certain value as a result of the range finding (step S20). Only when the subject range L is reduced within a certain value, the stored range finding data is updated (step S21).

The reason why the range L is updated only when a subject comes closer will be described. In the auto zoom mode, a subject is usually a person. When a person is photographed, unless the photography aims to produce artistic photographs, the person faces a camera. Therefore, if the person should move, he/she usually approaches the camera. For instance, when a camera is directed to a young child, he/she always runs closer. At a wedding ceremony, newlyweds entering a banquet hall are often photographed. However, newlyweds going out of a banquet hall are seldom photographed.

When a focus is to be locked during zoom driving, if people are photographed, a focus is usually locked in a person staying closest to the camera. This is because when range finding data acquired after zoom driving is adopted as it is, an aligned focus becomes misaligned. For instance, when a person stays out of a range finding zone, the range finding data indicates a far range. This data is, therefore, not adopted. Therefore, only when a measured range is shorter than the previous one, it should be determined that the subject has come nearer. This is the most preferable. Nevertheless, since a person is a subject, the subject never comes nearer at an infinite speed. Therefore, a person who runs 100 m for 10 seconds should be specified as a person who moves fastest. Therefore, a value given by the expression below may be employed as an aid in determining whether new range finding data represents a nearer range than the previous one and whether a difference between both the data is within a certain value.

$$\text{zoom driving time} \times 100 \text{ m}/10 \text{ sec} \qquad (3)$$

After the above operation, similarly to the process for the manual zoom mode described at the steps S4 to S12, Photometry is executed. Then, the image lens is driven according to the range finding data, and moves to a focusing position. Then, first release is checked. Then, when the release button is pressed fully to turn on second release, unless the self-timer mode is specified, the Exposure subroutine is executed immediately. If the self-timer mode is specified, the Exposure subroutine is executed at the completion of counting of the self-timer. Then, the film is wound.

Figure 8:
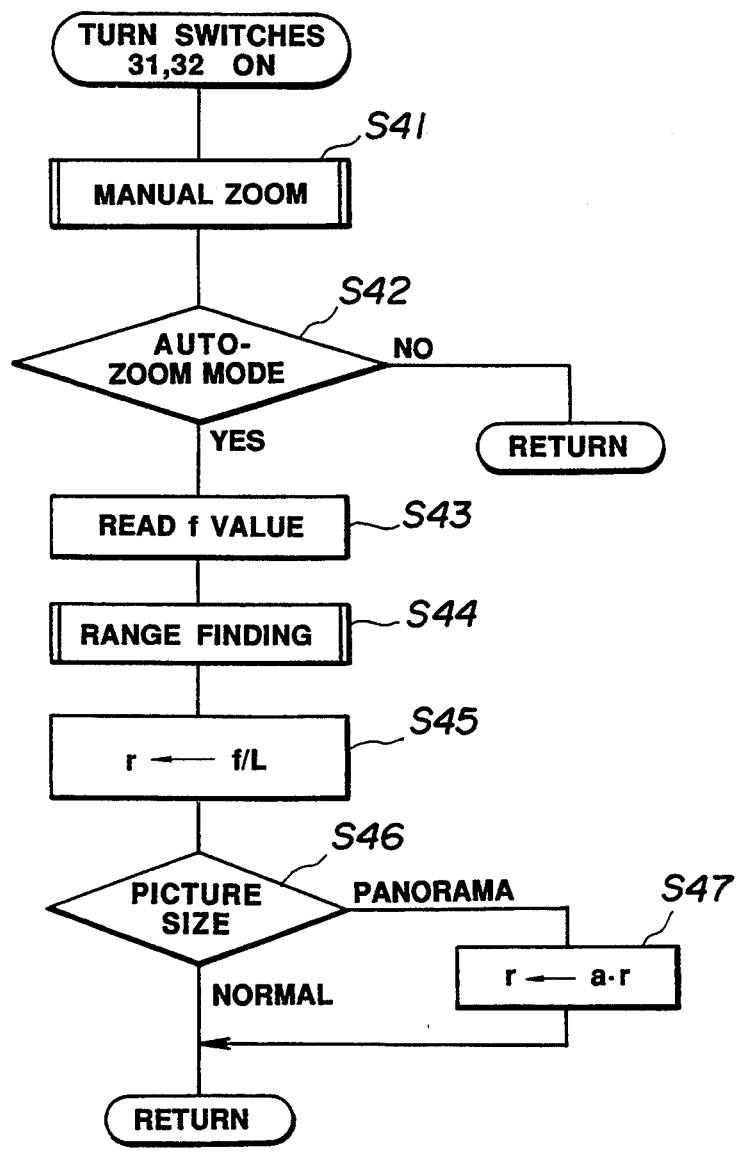
FIG. 8 is a flowchart for setting an imaging magnification by operating a zoom switch in the camera of the aforesaid embodiment.

When the zoom up switch 31 or the zoom down switch 32 is pressed, a routine shown in FIG. 8 is executed. These zoom switches 31 and 32 are operated to attain an intended imaging magnification r for a subject before the release button is pressed.

Within a routine activated by turning on the switch 31 or 32, first, a Manual Zoom subroutine is executed (step S41). The detail of the Manual Zoom subroutine will be described later in conjunction with FIG. 9. When the zoom up switch 31 is on, the zoom lens moves in a direction for extending a focal distance. When the zoom down switch 32 is on, the zoom lens moves In a direction for reducing a focal distance. When the switch 31 or 32 is turned off, zooming terminates.

After the Manual Zoom subroutine is executed, it is checked if the auto zoom mode is selected (step S42). If the auto zoom mode is not selected, the processing terminates. If the auto zoom mode is selected, an imaging magnification r is calculated and stored in the CPU 30. To be more specific, when Manual Zoom terminates, a zoom value f is read (step S43), then range finding is carried out to obtain a range L to an existing subject (step S44). Then, the range L and the current zoom value f are used to calculate an imaging magnification r according to the expression (2) (step S45).

After that, the picture size of the camera is checked (step S46). When the normal size is selected, the imaging magnification r calculated at the step S45 is stored in the CPU 30 as it is. On the other hand, when the panoramic size is selected, the imaging magnification r is multiplied by a coefficient a (step S47). Then, the product is stored as an imaging magnification r. That is to say, for panoramic photography, a panoramic imaging magnification r is stored in the CPU 30.

As described above, the zoom switch 31 or 32 is operated to perform zooming until an intended zoom position is attained. Then, a measured range value and a focal distance value that are measured after the zooming are used to calculate an imaging magnification r. Then, the imaging magnification r is stored in the CPU 30. After that, when the release button is pressed, as described previously, auto zooming is carried out to set the zoom lens at a zoom position for providing the stored imaging magnification r. Then, as far as the zoom switch 31 or 32 is operated again, the stored Imaging magnification r does not vary. Consequently, at every release, photography is performed using the same imaging magnification r.

When the imaging magnification r is to be changed, the zoom switch 31 or 32 is operated to perform zooming until an intended imaging magnification r is attained.

A stored imaging magnification r is for a normal-size camera picture. For panoramic photography, as described previously, an actual imaging magnification r' is a product of the above imaging magnification r by a.

Figure 9:
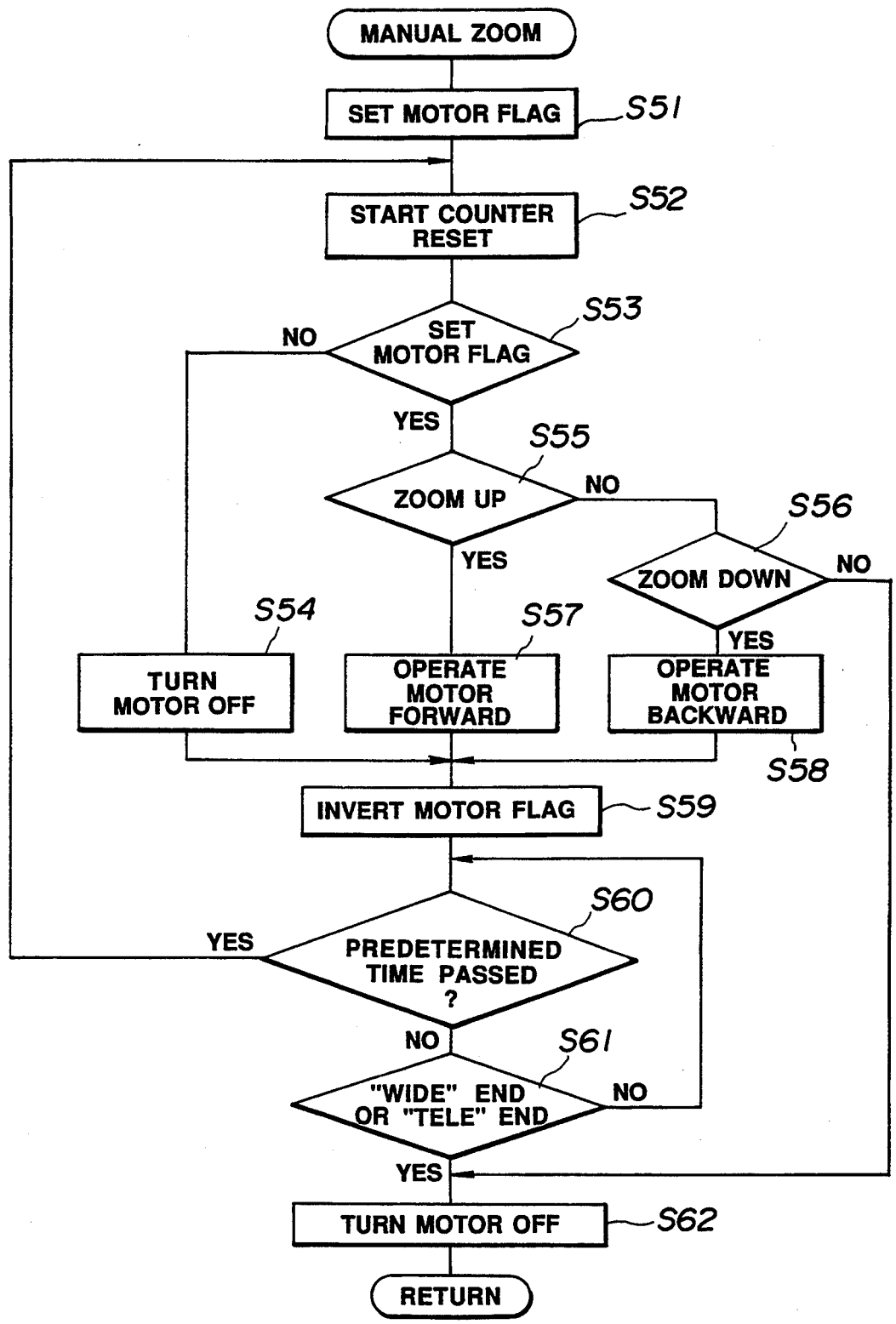
FIG. 9 is a flowchart for detailing a subroutine "Manual Zoom" in the process shown in FIG. 8.

Next, a Manual Zoom subroutine of a step S41 in FIG. 8 will be described in conjunction with FIG. 9. When the zoom up switch 31 or zoom down switch 32 is pressed, Manual Zoom shown in FIG. 9 is activated. First, a motor flag is set (step S51). When the motor flag is set, the zoom motor 2 is turned on. When the motor flag is reset, the zoom motor 2 is turned off.

Next, a timer counter is reset to start (step S52). The timer counter is used to determine that a certain duration has elapsed. When the zoom up switch 31 is pressed (step S55), the zoom motor 24 rotates normally to extend the zoom lens (step S57). When the zoom down switch 32 is pressed (step S56), the zoom motor 24 reverses to withdraw the zoom lens (step S58).

After the zoom motor 24 rotates or reverses, the motor flag is inverted (step S59). The rotation or reverse of the zoom motor 24 is continued until the timer counter completes counting seconds of a certain duration (step S60) or the zoom lens reaches a Wide end or a Tele end (step S61). For instance, after the rotation or reverse of the zoom motor 2 continues for a certain duration, the timer counter is reset to start. Then, the motor flag is checked ( step S53). In this case, when the motor flag is inverted at the step S59, the motor flag is reset. Therefore, the zoom motor 2 is turned off (step S54). Then, the motor flag is inverted again (step S59). After a certain duration is elapsed, the aforesaid operations are repeated.

As described above, when the motor is driven in the zoom-up direction, the drive pulse has a duty ratio of 1 vs. 1 (50%). When the motor is driven in the zoom-down direction, the drive pulse is also used. The duty ratio of the drive pulse is not limited to 1 vs. 1 but may be varied arbitrarily if necessary. This is also true for the frequency for driving the motor.

When the encoder 25 determines that the zoom lens has reached the Wide end or Tele end (step S6) or when the switches 31 and 32 are off (steps S55 and S56), the zoom motor 2 is turned off (step S62). Then, control returns to the main routine.

Figure 10:
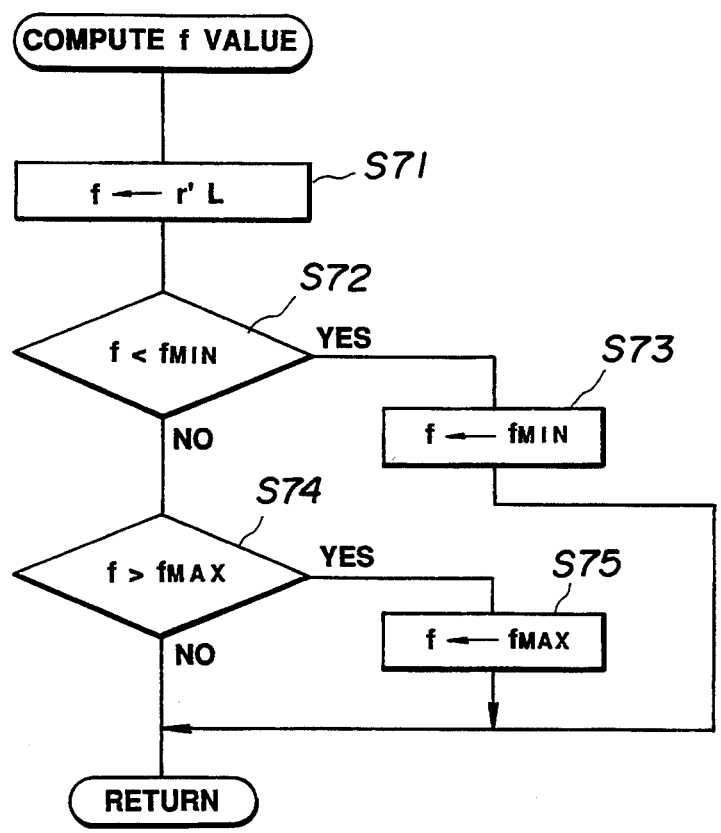
FIG. 10 is a flowchart for detailing a subroutine "f Calculation" in the main process.

FIG. 10 shows a subroutine for calculating a focal distance f of the step S16 shown in the flowchart of FIG. 6. In the process of the subroutine, first, a specified imaging magnification r' and a subject range L that is AF range finding data are used to calculate a focal distance f (step S71).

Next, if the calculated focal distance value f is smaller than a minimum $f_{MIX}$ of a focal distance of the zoom lens (step S72), the focal distance f is fixed to the minimum $f_{MIN}$ (step S73). If the calculated focal distance value f is larger than a maximum $f_{MAX}$ of a focal distance of the zoom lens (step S74), the focal distance f is fixed to the maximum $f_{MAX}$ (step S75). Then, when $f_{MIN} \leq f \leq f_{MAX}$, a calculated focal distance value f is adopted as it is.

This is intended to cope with an event that when a subject stays too near or too far with respect to a specified imaging magnification r', the imaging magnification r' may not be able to be attained. In this case, an alarm may be displayed on the liquid crystal display panel 21 or an alarm sound may be generated using a ceramic sounding device.

As described so far, according to the present invention, when photography is performed in auto zoom mode, an imaging magnification of a subject is varied depending on a normal picture size or a panoramic picture size, so that a ratio of a range of a portrait to a picture size will remain constant. Therefore, even if the panoramic picture size is adopted, the top and bottom portions of a portrait will not be cut out. Furthermore, addition of only a switch 36 is needed to realize a picture size detecting means. This hardly increases costs.

What is claimed is:

1. A camera having a zoom optical system, comprising:

said zoom optical system being capable of varying a focal distance controlled by a driving source;

a focal distance determining means for determining a focal distance of said zoom optical system based on range information to a subject provided by a range finding means and a given coefficient for keeping a subject size on a film plane substantially constant;

a control means for controlling said driving source to attain a focal distance determined by said focal distance determining means prior to a photographing operation; and a picture size selecting means for selecting a picture size;

whereby when said picture size selecting means selects a picture size, means responsive to a selected picture frame modifies a quantity of zooming by said driving source so that a ratio of a subject size to the selected picture size will substantially agree with a ratio of the subject size to a previous picture size.

2. A camera, comprising:

a zoom lens;

a focal distance determining means that determines a focal distance of said zoom lens based on range information to a subject and a magnification for imaging a subject image on a film plane;

a driving means for driving said zoom lens to attain a focal distance determined by said focal distance determining means;

a picture size selecting means for selecting a picture size from among a first picture size and a second picture size whose longitudinal dimension is larger than the first picture size; and a means for generating a coefficient according to a ratio of the longitudinal dimension of said first picture size to the longitudinal dimension of said second picture size;

whereby when said second picture size is selected as said picture size, said determined focal distance is modified according to said coefficient by means responsive to said selected picture size.

3. A camera according to claim 2, wherein said longitudinal dimension of said first screen size is 24 mm, and said longitudinal dimension of said second picture size is 13 mm.

4. A camera according to claim 2, wherein said coefficient has a value ranging from 0.5 to 0.6.

5. A camera, comprising:

a zoom lens;

a focal distance determining means that determines a focal distance of said zoom lens based on the basis of range information to a subject and a magnification for imaging a subject on a film plane;

a driving means that drives said zoom lens to attain a focal distance determined by said focal distance determining means;

a picture size selecting means for selecting a picture size from among a first picture size and a second picture size that is smaller than said first picture size; and a correcting means that responsive to a selected picture size for modifying an output of said focal distance determining means according to a ratio of said first picture size to said second picture size.

6. A camera according to claim 5, wherein said second picture size is longitudinally larger than said first picture size and has a length in a lateral direction which is the same as a lateral dimension of said first picture size.

7. A camera, comprising:

a zoom lens;

a focal distance determining means that determines a focal distance of said zoom lens based on range information to a subject and a magnification for imaging a subject on a film plane;

a driving means that drives said zoom lens to attain a focal distance determined by said focal distance determining means;

a picture size selecting means for selecting a picture size from among a first picture size and a second picture size that is smaller than said first picture size;

a correcting means responsive to a selected picture size for modifying an output of said focal distance determining means according to a ratio of said first picture size to said second picture size; and said correcting means including means for multiplying an imaging magnification by a given coefficient.

8. A camera according to claim 7, wherein said coefficient has a value of 1 or less.

9. A camera having an optical system that can vary a focal distance and which permits selection of a picture size, comprising:

a picture selecting means capable of selecting a picture size from among a normal picture size and a smaller picture size which is smaller than said normal picture size;

a picture detecting means for detecting a size of a picture selected by said picture selecting means;

a subject range detecting means for detecting a range to a subject;

a motor driving means for varying a focal distance of said optical system;

a focal distance detecting means that detects a focal distance of said optical system; and a control means for determining an image magnification for a subject image based on an output of said picture size detecting means and an output of said subject range detecting means, and driving said optical system using said motor driving means to attain an intended focal distance based on image magnification, so that the subject image will have said intended image magnification to maintain a fixed ratio of subject to picture size.

10. A camera according to claim 9, wherein said smaller picture size is a panoramic size.

11. A camera having an optical system that can vary a focal distance and which permits selection of a picture size, comprising:

a picture size selecting means capable of selecting a picture size from among a normal picture size and a different picture size, the sizes of said normal picture size and said different picture size being different;

a picture detecting means that detects a size of a picture selected by said picture selecting means;

a subject range detecting means for detecting a range to a subject;

a motor driving means for varying a focal distance of said optical system; and a control means for determining an image magnification for a subject image based on an output of said picture size detecting means and an output of said subject range detecting means, and driving said optical system using said motor driving means to attain a focal distance based on image magnification to maintain a fixed ratio of subject to picture size.

12. A camera according to claim 11, wherein said different picture size is a panoramic size.

13. A camera having an optical system that can vary a focal distance and which permits selection of a picture size, comprising:

a picture size selecting means capable of selecting a picture size from among a normal picture size and a different picture size, the sizes of said normal and different picture sizes being different;

a picture size selection operating means for switching said picture size selecting means to select a picture size, and outputting the selected size;

a subject range detecting means for detecting a range to a subject;

a focal distance detecting means for detecting a focal distance of said optical system;

a motor driving means for varying a focal distance of said optical system; and a control means for determining an image magnification for a subject image based on an output of said picture size selection operating means and an output of said subject range detecting means, and driving said optical system using said motor driving means to attain an intended focal distance based on image magnification to maintain a fixed ratio of subject to picture size.

14. A camera having an optical system that can vary a focal distance and which permits selection of a picture size, comprising:

a picture size selecting means capable of selecting a picture size from among a normal picture size and a smaller picture size, the sizes of said normal and different picture sizes being different;

a picture size detecting means for detecting a size of a picture selected by said picture selecting means;

a subject range detecting means for detecting a range to a subject;

a motor driving means for varying a focal distance of said optical system;

a focal distance detecting means for detecting a focal distance of said optical system;

a control means for driving said motor driving means whereby when photography is performed at a normal picture size, a given image magnification for a subject image is determined based on an output of said subject range detecting means, and said optical system is driven by controlling said motor driving means to attain an intended focal distance based on the given image magnification, so that the subject image will have the intended image magnification, and whereby, responsive to photography performed at a smaller picture size, an image magnification smaller than the given image magnification is determined, and said optical system is driven by controlling said motor driving means to attain an intended focal distance based on the last-mentioned image magnification, so that the subject image will have the smaller image magnification to thereby maintain a fixed ratio of subject to picture size.

15. A camera having an optical system that can vary a focal distance and which permits selection of a picture size, comprising:
   an optical system capable of varying a focal distance;
   a picture size selecting means for selecting a picture size;
   a motor driving means for varying a focal distance of an optical system;
   a magnification determining means for determining an image magnification;
   a range detecting means for detecting a range to a subject; and
   a control means for driving said optical system and that determines an image magnification based on a selected picture size and range information provided by said range detecting means, and drives said optical system using said motor driving means to attain said image magnification regardless of which picture size is selected.

16. A camera according to claim 15, wherein said selecting means selects one of a normal picture size and a panoramic picture size.

17. A camera, comprising:
   a focal distance controlling means including an auto zoom function;
   a selecting means for selecting a picture size from among a standard picture size and a panoramic picture size; and
   a correcting means for correcting the actuation of said focal distance controlling means according to an output of said selecting means whereby a correcting operation employs a first correcting value responsive to selection of a standard picture size and a second correcting value different from said correcting value responsive to selection of a panoramic picture size.

18. A method for operating a camera having a taking lens, which is movable to adjust a focal length, and a picture size adjusting means for selecting a picture size between a normal size and a small picture size, said method comprising the steps of:
   (a) determining a distance between a subject and the taking lens;
   (b) calculating a magnification value for imaging a subject on a film plane responsive to the determined distance and a focal distance value representing a present position of the taking lens, said magnification value being representative of a normal size image;
   (c) providing a predetermined adjustment factor representing a ratio of the two selectable picture sizes;
   (d) selecting a picture frame size;
   (e) utilizing the magnification value obtained in step (b) when the normal size picture is detected;
   (f) adjusting the taking lens to obtain a focal length as a function of the range value and magnification;
   (g) operating the zoom lens optical system to set the zoom lens system so as to obtain a desired focal distance; and
   (h) readjusting the zoom lens optical system according to said adjustment factor so that a ratio of the subject size relative to the picture frame size remains constant regardless of the selected picture frame size.

19. A method for Operating a camera having a taking lens, which is movable to adjust a focal length, and a picture size adjusting means for selecting a picture size between a normal size and a small picture size, said method comprising the steps of:
   (a) determining a distance between a subject and the taking lens;
   (b) calculating a magnification value for imaging a subject on a film plane responsive to the determined distance and a focal distance value representing a present position of the taking lens, said magnification value being representative of a normal size image;
   (c) selecting a picture frame size; and
   (d) utilizing the magnification value obtained in step (b) when the normal size picture is detected; and
   (e) adjusting the taking lens to obtain a focal length as a function of the range value and magnification;
   step (d) further comprising the steps of:
   (f) multiplying the magnification value by a predetermined factor when the detected frame size is the smaller size picture; and
   (g) adjusting the taking lens according to the value determined in step (f).

20. A method for operating a camera having an adjustable zoom lens system movable to obtain a desired focal distance adjustable over a predetermined range, and an adjustable picture size selecting means, said method comprising the steps of:
   (a) moving the zoom lens to obtain a desired focal distance;
   (b) determining a distance between an image and the zoom lens;
   (c) adjusting the picture size selecting means for selecting a picture size;
   (d) determining a magnification value according to the distance value and focal length of the zoom lens in its present position, said magnification value being determined responsive to a given one of a group of picture sizes;
   (e) detecting the selected picture size;
   (f) multiplying the magnification value by a predetermined constant factor when the picture size is different from said given one of said group of picture sizes to obtain a modified magnification;
   (g) calculating a focal length value according to the modified magnification value and distance value to obtain a modified focal length value; and
   (h) readjusting the zoom lens optical system according to the modified focal length value.

21. The method of claim 20 wherein the magnification value obtained in step (d) represents a magnification value when the picture size is a normal picture size.

22. The method of claim 21 wherein step (f) further comprises the step of utilizing a constant factor in the range of from 0.5 to 0.6 when the selected picture size is a picture size smaller than a normal picture size.

23. The method of claim 20 wherein step (g) further comprises the steps of:
   (i) comparing the modified focal length value with a predetermined minimum value; and
   (j) utilizing said predetermined minimum value when the modified focal value is less than said predetermined minimum value.

24. The method of claim 20 wherein step (g) further comprises the steps of:
 (i) comparing the modified focal length value with a predetermined maximum value; and
 (j) utilizing the predetermined maximum value when said modified focal length value is greater than said predetermined maximum value.

25. The method of claim 20 wherein step (g) further comprises the steps of:
 (i) comparing the modified focal length value against predetermined maximum and minimum values; and
 (j) utilizing the modified focal length value to adjust the lens when said modified focal length value is greater than said minimum value and less than said maximum value.

26. The method of claim 25 wherein step (g) further comprises the steps of:
 (i) comparing the modified focal length value with a predetermined minimum value; and
 (j) utilizing said predetermined minimum value when the modified focal value is less than said predetermined minimum value.

27. The method of claim 25 wherein step (g) further comprises the steps of:
 (i) comparing the modified focal length value with a predetermined maximum value; and
 (j) utilizing the predetermined maximum value when said modified focal length value is greater than said predetermined maximum value.

* * * * *